United States Patent [19]

Donnelly et al.

[11] Patent Number: 5,631,820
[45] Date of Patent: May 20, 1997

[54] MULTIPLE DC, SINGLE AC CONVERTER WITH A SWITCHED DC TRANSFORMER

[75] Inventors: Matthew K. Donnelly, Kennewick; Donald J. Hammerstrom, West Richland, both of Wash.

[73] Assignee: Battelle Memorial Institute, Richland, Wash.

[21] Appl. No.: 525,869

[22] Filed: Sep. 8, 1995

[51] Int. Cl.[6] ................................................ H02M 7/515
[52] U.S. Cl. ............................................. 363/135; 363/97
[58] Field of Search .................................. 363/65, 71, 97, 363/135, 137

[56] References Cited

U.S. PATENT DOCUMENTS 5,155,672  10/1992  Brown ..................................... 363/43
5,373,433  12/1994  Thomas ................................... 363/97

OTHER PUBLICATIONS

M.K. Donnelly (Pacific Northwest Laboratory) and R.M. Johnson (Montana State University), "Power System Applications for PASC Converter Systems", *IEEE Transactions on Power Delivery*, vol. 10, No. 1, Jan. 1995, pp. 439–444.

Roy Johnson (Montana State University) and Matt Donnelly (Battelle Pacific Northwest Laboratory), "Pulse–Amplitude–Synthesis–and–Control (PASC) Power Converter for Power System Connection of a Diagonally Connected MHD Generator", *Symposium on the Engineering Aspects of MHD*, Jul. 6, 1993, pp. V111b.1.1–V111b.1.12.

Roy Johnson and Matt Donnelly, "A Pulse–Amplitude–Synthesis–and–Control (PASC) Inversion System for Single––source Diagonally Connected MHD Generators", *1993 IEEE*, pp. 1–7.

R.M. Johnson, M.K. Donnelly, and K.E. Marcotte, "A Pulse–Amplitude–Synthesis–and–Control (PASC) Consolidation/Inversion System for Faraday Connected MHD Generators", *1992 IEEE*, pp. 1–7.

Philip D. Corey, "Methods for Optimizing the Waveform of Stepped–Wave Static Inverters", *AIEE Summer General Meeting*, Jun. 17, 1962.

*Primary Examiner*—Stuart N. Hecker
*Attorney, Agent, or Firm*—Paul W. Zimmerman

[57] ABSTRACT

The invention is an improvement of the PASC inverter, wherein the improvements include the reduction from two shorting gates per transformer to one shorting gate per transformer and replacement of active control of the shorting gate with passive control of the shorting gate. Further advantages are obtained through the use of anti-parallel gate sets.

13 Claims, 10 Drawing Sheets

MULTIPLE DC, SINGLE AC CONVERTER WITH A SWITCHED DC TRANSFORMER

This invention was made with Government support under Contract DE-AC06-76RLO 1830 awarded by the U.S. Department of Energy. The Government has certain rights in the invention.

FIELD OF THE INVENTION

The present invention relates generally to an apparatus for converting either multiple DC (direct current) inputs into a single AC (alternating current) output or single AC input to multiple DC outputs. More specifically, the apparatus of the present invention uses a switched DC transformer for conversion.

BACKGROUND OF THE INVENTION

With increased interest in distributed DC electrical power systems, there is the problem of consolidating and inverting electrical power from diverse DC sources into a single AC power grid. This problem arises upon interconnecting arrays of batteries, fuel cells, solar cells, multi-electrode pair magnetohydrodynamic generators, wind turbine generators or any combination thereof.

Figure 1A:
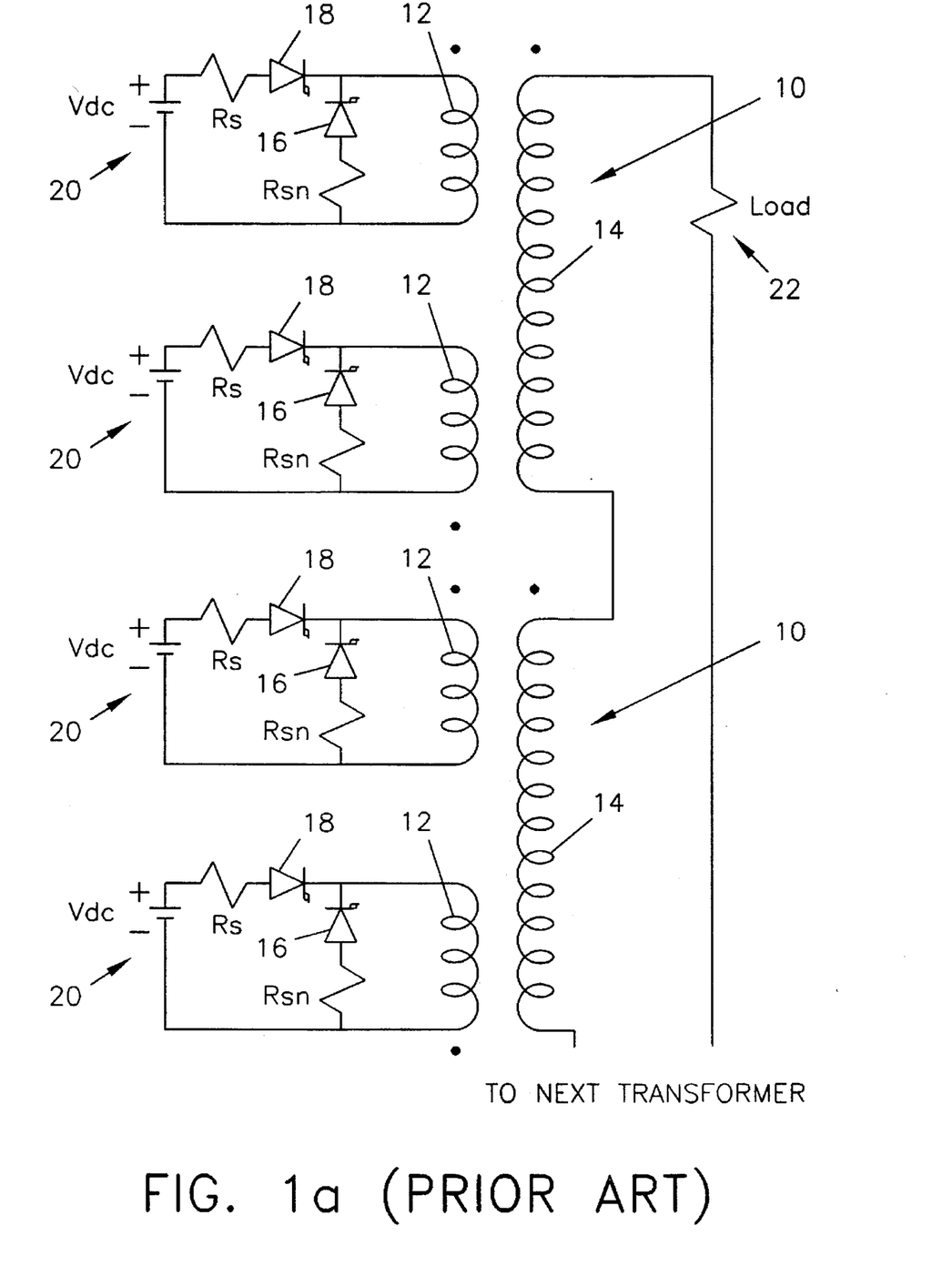
FIG. 1a is a schematic of a prior art converter.
Figure 1B:
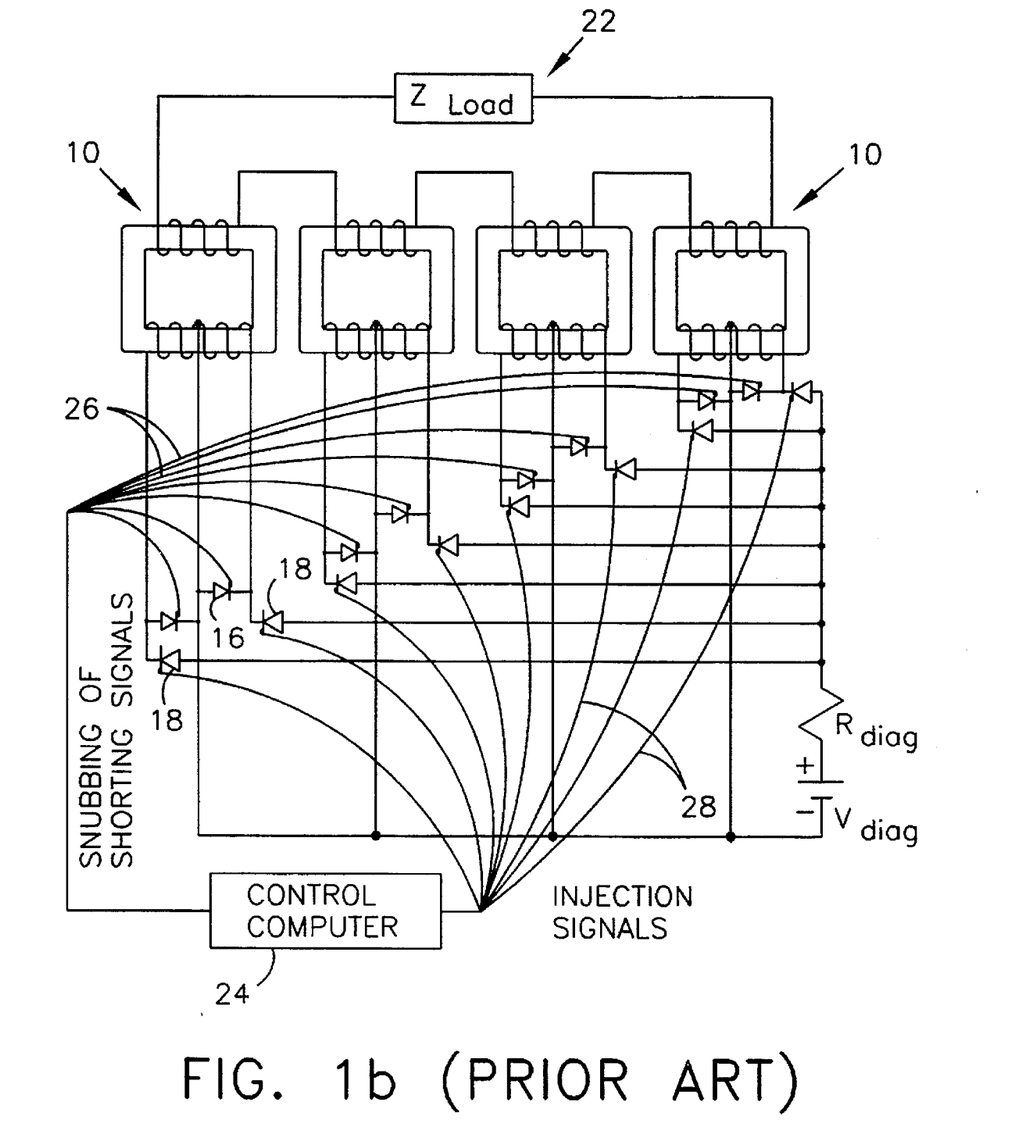
FIG. 1b is a schematic of the prior art converter with a control computer.

Work by R M Johnson and V Skurdall was published in the Proceedings of the 24th Symposium on Engineering Aspects of MHD (SEAM) in Butte, Mont., Jun. 24–27, 1986, entitled PULSE-AMPLITUDE-SYNTHESIS-AND-CONTROL (PASC) OF MHD COMMERCIAL POWER OUTPUT. This work used a digitally controlled thyristor switching matrix connected to switched DC transformers as shown in FIGS 1a and 1b. The same apparatus was also described in (1) 1992 IEEE, 92 SM 520-7 EC, A PULSE-AMPLITUDE-SYNTHESIS-AND-CONTROL (PASC) CONSOLIDATION/INVERSION SYSTEM FOR FARADAY CONNECTED MHD GENERATORS, R M Johnson, M K Donnelly, and K E Marcotte, (2) 1993 IEEE, 93 WM 055-4 EC, A PULSE-AMPLITUDE-SYNTHESIS-AND-CONTROL (PASC) INVERSION SYSTEM FOR SINGLE-SOURCE DIAGONALLY CONNECTED MHD GENERATORS, R Johnson, and M Donnelly, and (3) July 1993, Symposium on the Engineering Aspects of MHD, PULSE AMPLITUDE-SYNTHESIS-AND-CONTROL (PASC) CONVERTER FOR POWER SYSTEM CONNECTION OF A DIAGONALLY CONNECTED MHD CONVERTER, R M Johnson, and M K Donnelly.

Referring now to FIG. 1a, there are two transformers 10, each having two primary windings 12, and each having one secondary winding 14. Each primary winding 12 is connected in parallel to a shorting or snubbing gate 16, in series to a power injection gate 18, and thence in parallel with a DC source 20. Each DC source 20 is independent. The secondary windings 14 are connected in parallel to an AC load 22.

In FIG. 1b, the same components are shown, and in addition, a control computer 24 providing snubbing or shorting signals 26, and injection signals 28 to all shorting or snubbing gates 16 and to all power injection gates 18 according to a control algorithm.

Figure 1C:
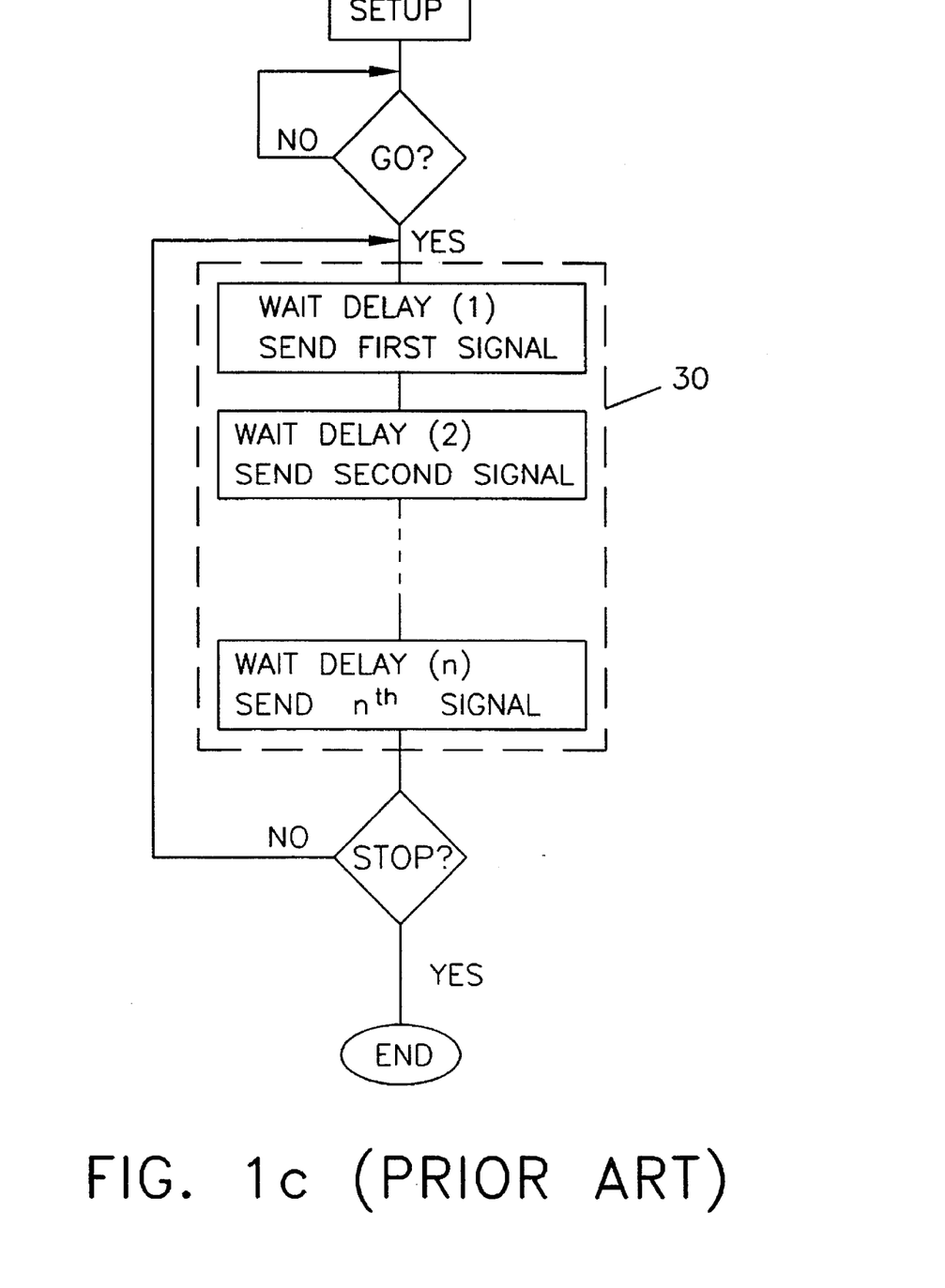
FIG. 1c is a prior art algorithm flow chart.

The control algorithm is shown in FIG. 1c. A fixed delay or sequence of delays is used which does not permit synchronous operation. However, a pseudo synchronous operation was achieved by the step of comparing the zero crossing of the stepped wave to the zero crossing of the AC grid. Even with the zero crossing comparison, only 1 or 2 quadrant control was possible. In operation, the control steps 30 provide a control signal (26, 28) to each gate 16 according to the schedule of fixed delays.

Although the PASC inverter is able to consolidate disparate DC power inputs into a single AC output, it is limited to single quadrant or, at best, two quadrant operation and is always lagging and therefore not synchronized to an AC power grid. It will be understood by those of skill in the art of electrical power generation and transmission that "quadrant operation" refers to the quadrants defined by the orthogonal axes of power and reactive power.

SUMMARY OF THE INVENTION

It is therefore an object of the present invention to provide a converter that may be synchronized with an AC power grid.

It is a further object of the present invention to provide a converter capable of four quadrant control.

The invention is an improvement of the PASC inverter, wherein the improvements include the reduction from two shorting gates per transformer to one shorting gate per transformer and replacement of active control of the shorting gate with passive control of the shorting gate. Further advantages are obtained through the use of anti-parallel gate sets.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 2A:
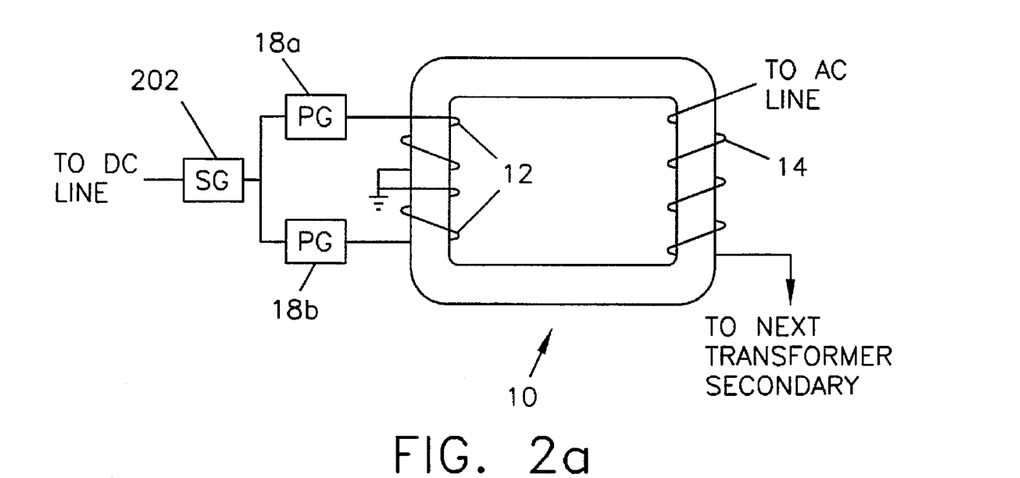
FIG. 2a is a schematic of a first embodiment of the present invention.
Figure 2B:
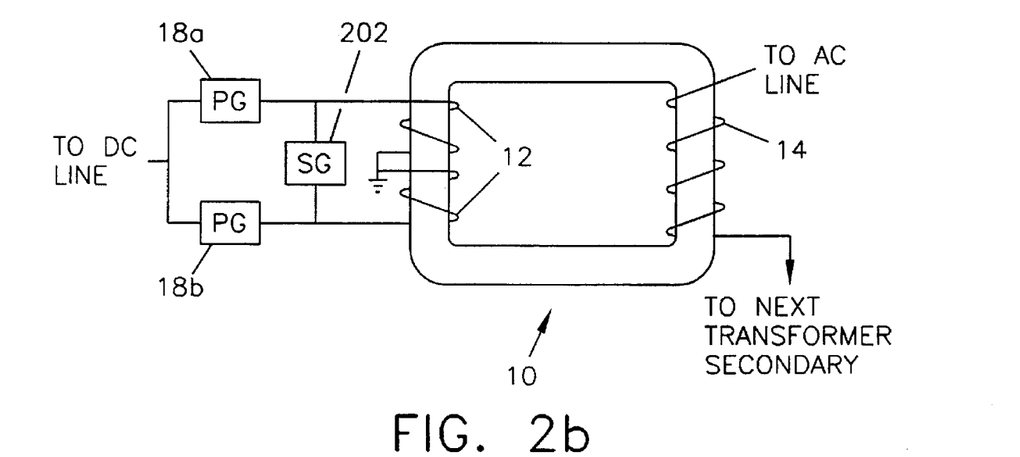
FIG. 2b is a schematic of a second embodiment of the present invention.

The present invention shown in FIGS. 2a and 2b is a converter having at least two switched DC transformers The AC side may be single phase or phases of multiple phase AC. The transformers 10 may be single or multi-phase transformers, or may be single-phase transformers connected to form an equivalent multi-phase converter. It is preferred to have at least one switched DC transformer for each separate DC line to maintain resolution. In certain applications, it may be useful to have several DC lines connected to a single switched DC transformer 10.

Each of the switched DC transformers 10 has two primary coils 12 connected to at least one DC power line, and a single secondary coil 14 connected to an AC power line, wherein the two primary coils 12 of each transformer 10 are in parallel to each other, and the secondary coil 14 of each transformer 10 is in series with the secondary coil 14 of the other transformer 10. The converter further has a power injection gate (PG) 18 in series with each of said primary coils 12.

A single shorting gate (SG) 202 is on the primary side of each transformer 10. In one embodiment, the single shorting gate 202 in FIG. 2a is placed electrically "upstream" of the power injection gates 18 and in series with them. This is preferred so that in the event of any single gate failure, the DC source may be removed from the circuit. In a second embodiment, the single shorting gate 202 in FIG. 2b is placed in parallel to the primary coils 12 and preferably between the primary coils 12 and the power injection gates 18. This embodiment lacks the safety of the first embodiment. A further embodiment shown in FIG. 2d shows a shorting gate 202 parallel to one of the primary coils 12 and connected to a primary ground 204. This embodiment is less preferred because it does not have the safety feature of the embodiment of FIG. 2a and is asymmetrical in operation. A fourth embodiment shown in FIG. 2e shows the shorting gate 202 "downstream" of the transformer on the AC side.

Figure 3:
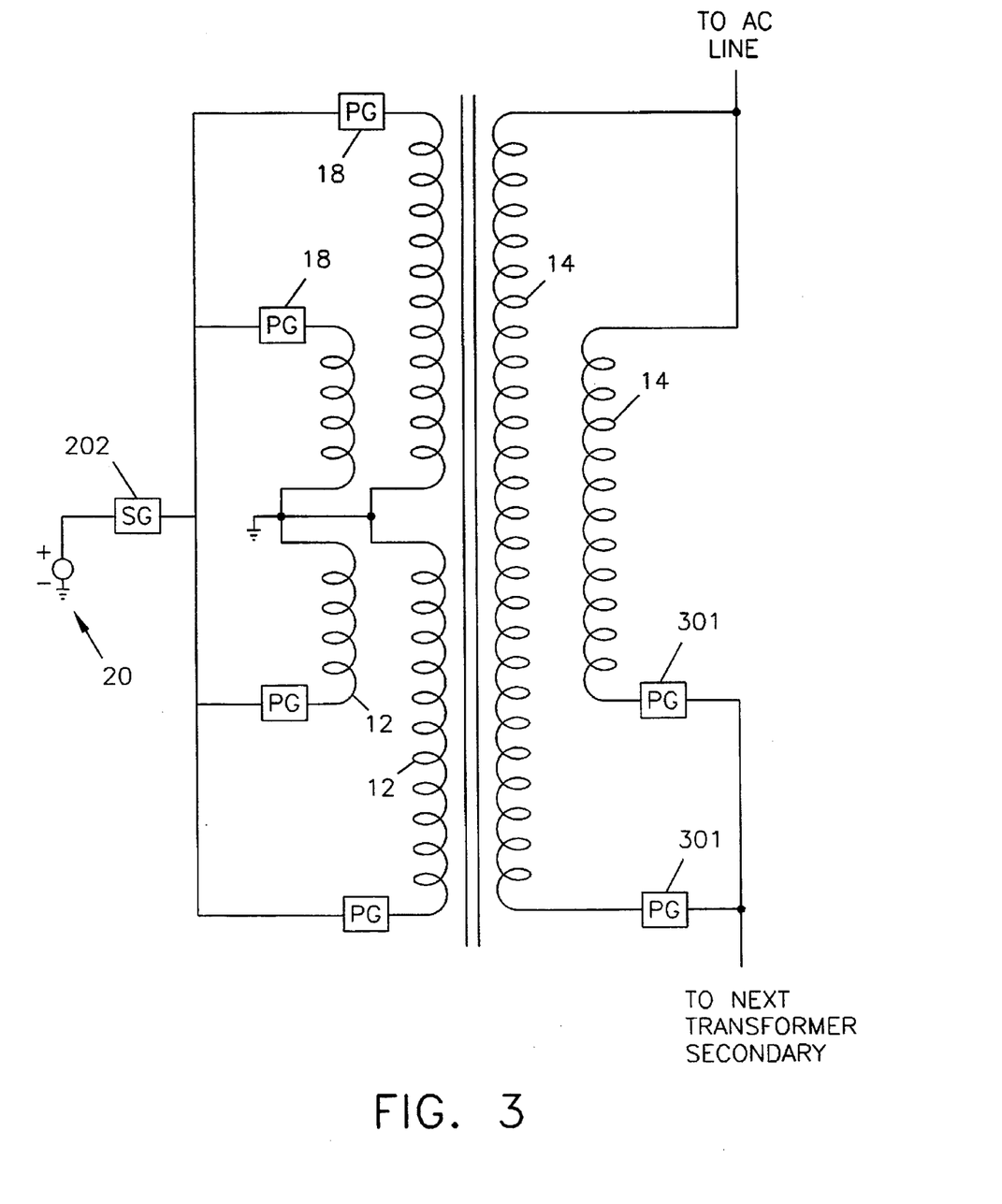
FIG. 3 is a schematic of a further embodiment of the present invention.

It will be apparent to one skilled in the art that converters of more than three windings may be used. FIG. 3 shows a converter having more than three windings permitting greater flexibility in voltage control. Each primary coil 12 has a power injection gate 18 and a single shorting gate 202, according to the present invention. In addition, a power gate 301 is provided on the AC side in series with each secondary coil 14. When each secondary coil 14 has a ratio of 2:1 and the parallel primary coils 12 also have a ratio of 2:1, then voltage is controllable in magnitude up to a factor of 4.

Figure 2C:
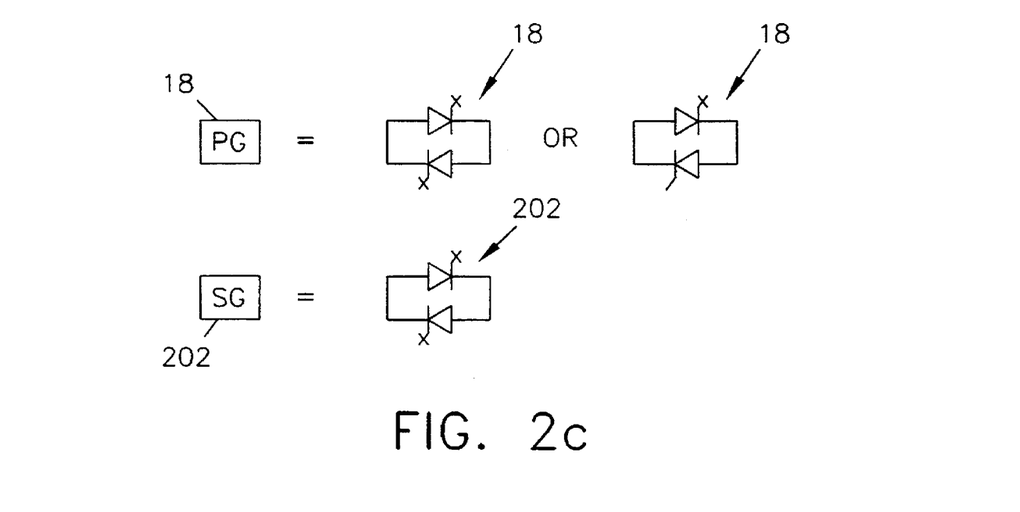
FIG. 2c is a schematic definition of power injection gate and shorting gate.
Figure 2D:
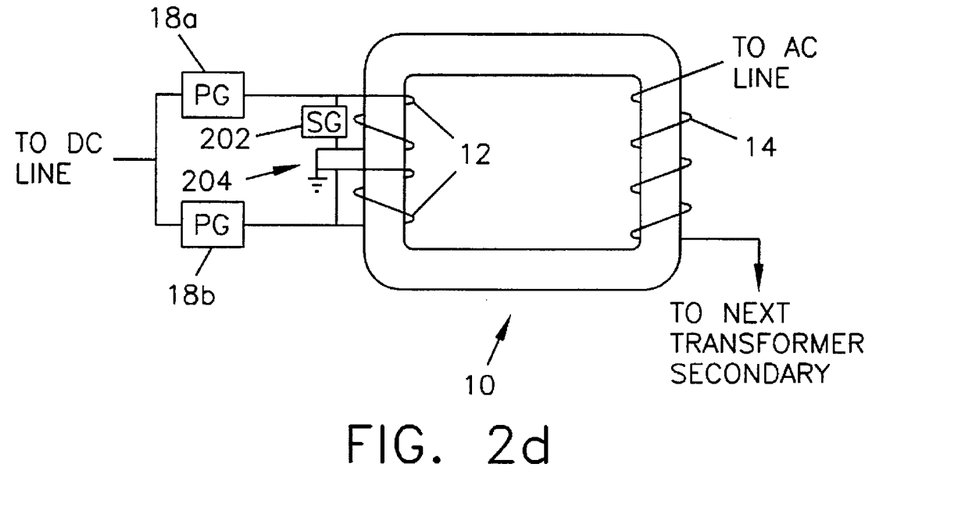
FIG. 2d is a schematic of a third embodiment of the present invention.
Figure 2E:
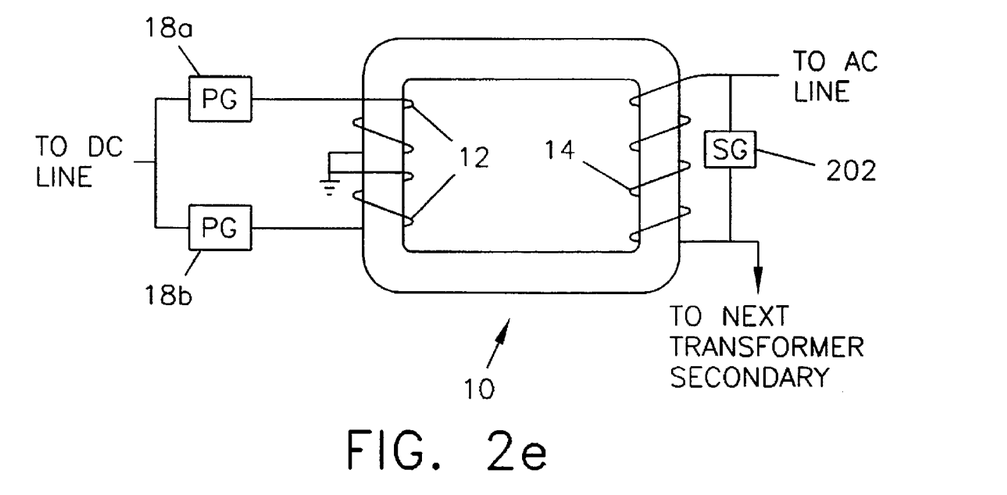
FIG. 2e is a schematic of a fourth embodiment of the present invention.

While each of the gates may be a single forward thyristor, it is preferred that each of the gates is an anti-parallel gate as shown in FIG. 2c. The anti-parallel gates permit four quadrant operation with an AC grid. On the DC side of the converter, there may be single or multiple DC power sources and/or single or multiple DC loads. With each DC source or load connected to a separate primary coil pair, it is possible to synchronize with the AC grid to either receive net DC power generation into the AC grid or to accept net DC power consumption from the AC grid. Of particular advantage is application to large wind farms having tens to hundreds of wind turbines. When a gust of wind moves through the farm, the turbines are intermittently loaded. Before the present invention, it was necessary to simply shed the intermittent load. With the converter of the present invention, the intermittent load can be accepted into the converter and synchronized to the AC grid. Moreover, as a gust moves through the wind farm, each intermittently loaded turbine can be converted independently of the operation of any other turbine.

For the gates shown in FIG. 2c, it is preferred to use an anti-parallel configuration that permits four-quadrant operation. For the power injection gate 18, both of the thyristors may be force commutated, or one of the thyristors may be line commutated. For the shorting gate 202, both of the thyristors must be force commutated. Further, it is preferred that the switches used to control the gates are MOS-controlled Thyristor (MCT) switches. MCT switches are sufficiently fast to permit microprocessor-based step conversion.

Figure 4A:
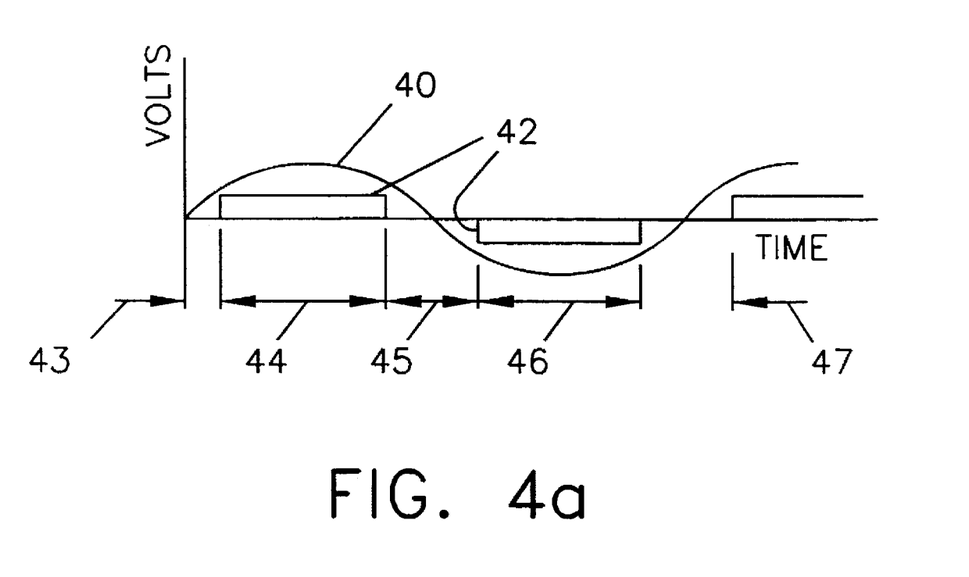
FIG. 4a is a diagram of voltage versus time.

The gates are controlled by a control computer. More specifically, the power input gates are actively controlled by the control computer, and the shorting gate is passively controlled based upon the electrical signal and the status of the power gates. For the embodiment of FIG. 2a, the "upper" power gate is denoted as "a" and the "lower" power gate is denoted as "b". The shorting gate is controlled then according to $$G_{SG} = \overline{G_a \text{ AND } G_b} \rightarrow \text{NOT}(G_a \text{ AND } G_b) \tag{1}$$

where "G" denotes the gate firing pulse (voltage) for the specified gate. The gate on/off cycles and subsequent stepped output for a single transformer are shown in FIG. 4a. An ideal sinusoidal wave 40 is to be matched by the transformer 10. The stepped output 42 is from a single transformer 10 having gates as in FIG. 2a wherein the power gates 18 are actively controlled by the control computer, and the shorting gate 202 is controlled according to equation (1). For intervals 43, 45, and 47, both power gates 18 are on. For interval 44, the upper power gate 18a and the shorting gate 202 are on. For interval 46, the lower power gate 18b and the shorting gate are on.

For the embodiments of FIGS. 2b, 2d, and 2c, the shorting gate is controlled according to $$G_{SG} = \overline{G_a \text{ OR } G_b} \rightarrow \text{NOT}(G_a \text{ OR } G_b) \tag{2}$$

Figure 4B:
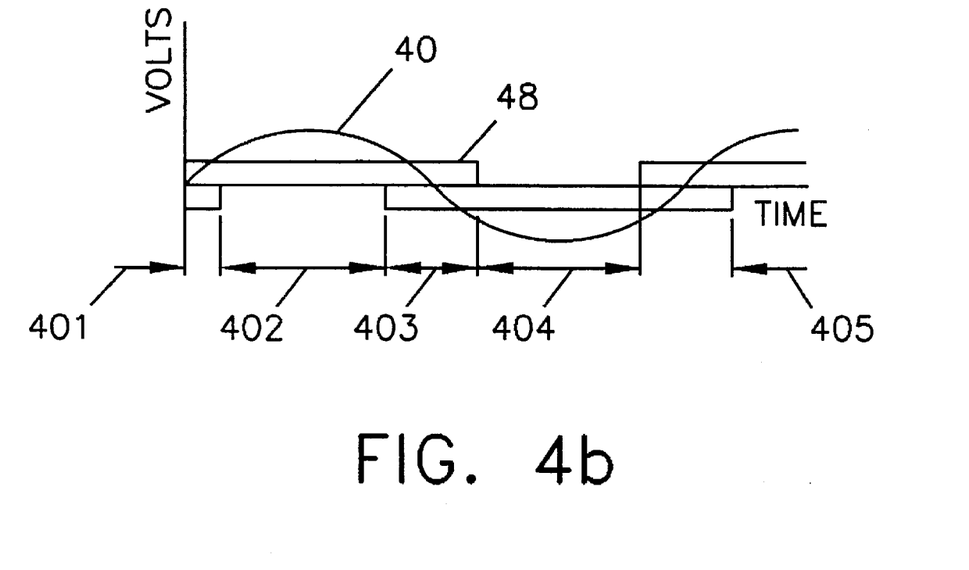
FIG. 4b is a diagram of voltage versus time.

The gate on/off cycles and subsequent stepped output for a single transformer are shown in FIG. 4b. An ideal sinusoidal wave 40 is to be matched by the transformer 10. The stepped output 48 is from a single transformer 10 having gates as in FIG. 2b, 2d, or 2c, wherein the power gates 18 are actively controlled by the control computer, and the shorting gate 202 is controlled according to equation (2). For intervals 401, 403, and 405, the shorting gate 202 is on. For interval 402, the upper power input gate 18a is on, and for interval 404, the lower power input gate 18b is on. Equations (1) and/or (2) are entered into the control computer as an instruction set for control of the shorting gates 202.

Within the control computer is a main timer that initiates gate switching. The main timer counts a specified number of ticks corresponding to an AC line frequency, then resets and starts over. The number of ticks is determined each cycle by calculating an error between the timer reset time and a synchronizing pulse, thereby keeping the cycle time of the main timer consistent with the AC power line frequency and permitting synchronization of the converter with the grid. For each transformer 10, there is a transformer timer slaved to the main timer or to a subtimer with subtimers continuously slaved to the main timer. The transformer timers indicate when signals are sent from the control computer's application specific integrated circuit (ASIC) port to the gate firing drivers of the switches on the power gates 18. The phase of the transformer timers is shifted with respect to the main timer through software controls.

In addition to standard operation, the control computer contains instructions that check for off-normal events, for example, loss of line voltage, loss of synchronizing signal, extreme frequency deviation, undervoltage, and operator emergency shutdown. The instructions initiate appropriate action for the identified off-normal event.

The synchronizing signal is obtained from the positive-slope zero crossing of the AC line voltage. If the AC line voltage is noisy, it may be passed through a filter. The AC line voltage or filtered AC line voltage is passed to a synchronizer. The synchronizer has a Schmitt Trigger that receives the positive-slope zero crossing of the AC line voltage. The synchronizer further has a pulse generator that receives an output from the Schmidt Trigger. A second output from the pulse generator is sent through a comparator. The output of the comparator is a third output that is the synchronizing signal sent to the main timer.

Figure 5:
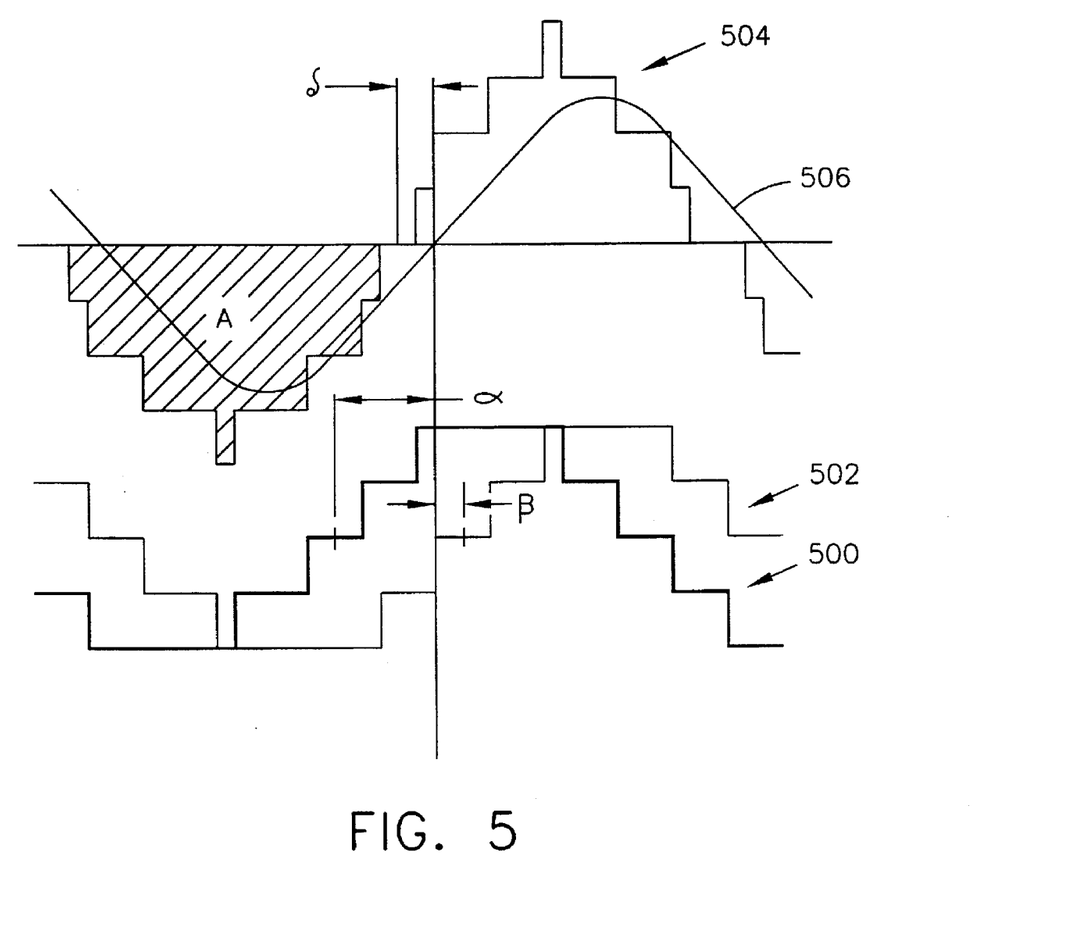
FIG. 5 is a diagram of a stepped wave approximation of a sinusoidal wave.

Control or synthesis of the stepped-wave output may be illustrated by a two-transformer converter system. It will be apparent to one skilled in the art of converter systems that many transformer outputs may be combined, but for simplicity of illustration, two will be discussed. FIG. 5 shows a first output 500, and a second output 502. The first output 500 is added to the second output 502 to obtain a superposition output 504. The power angle $\gamma$ is controlled by advancing or retarding both $\alpha$ and $\beta$ together according to $$\gamma = \alpha - (\alpha - \beta)/2 \qquad (3)$$

The area A (shaded region) is controlled by advancing and retarding $\alpha$ and $\beta$ independently according to $$A \propto \cos((\alpha - \beta)/2) \qquad (4)$$

By controlling the power angle and the area A, the superposition output 504 is synchronized with the desired line voltage 506. The third and fifth harmonics are eliminated by selecting certain switching points within the transformers. The seventh harmonic can be eliminated through proper choice of the difference between $\alpha$ and $\beta$. Details of harmonic elimination by spacing stepped waves are well published; for example, METHODS FOR OPTIMIZING THE WAVEFORM OF STEPPED-WAVE STATIC INVERTERS, Phillip D. Corey, Power Semiconductor Applications, Vol. 1: General Consideration, IEEE Press, 1972, reprinted from IEEE Paper 62-1147, AIEE Summer General Meeting, June 1962.

Figure 6:
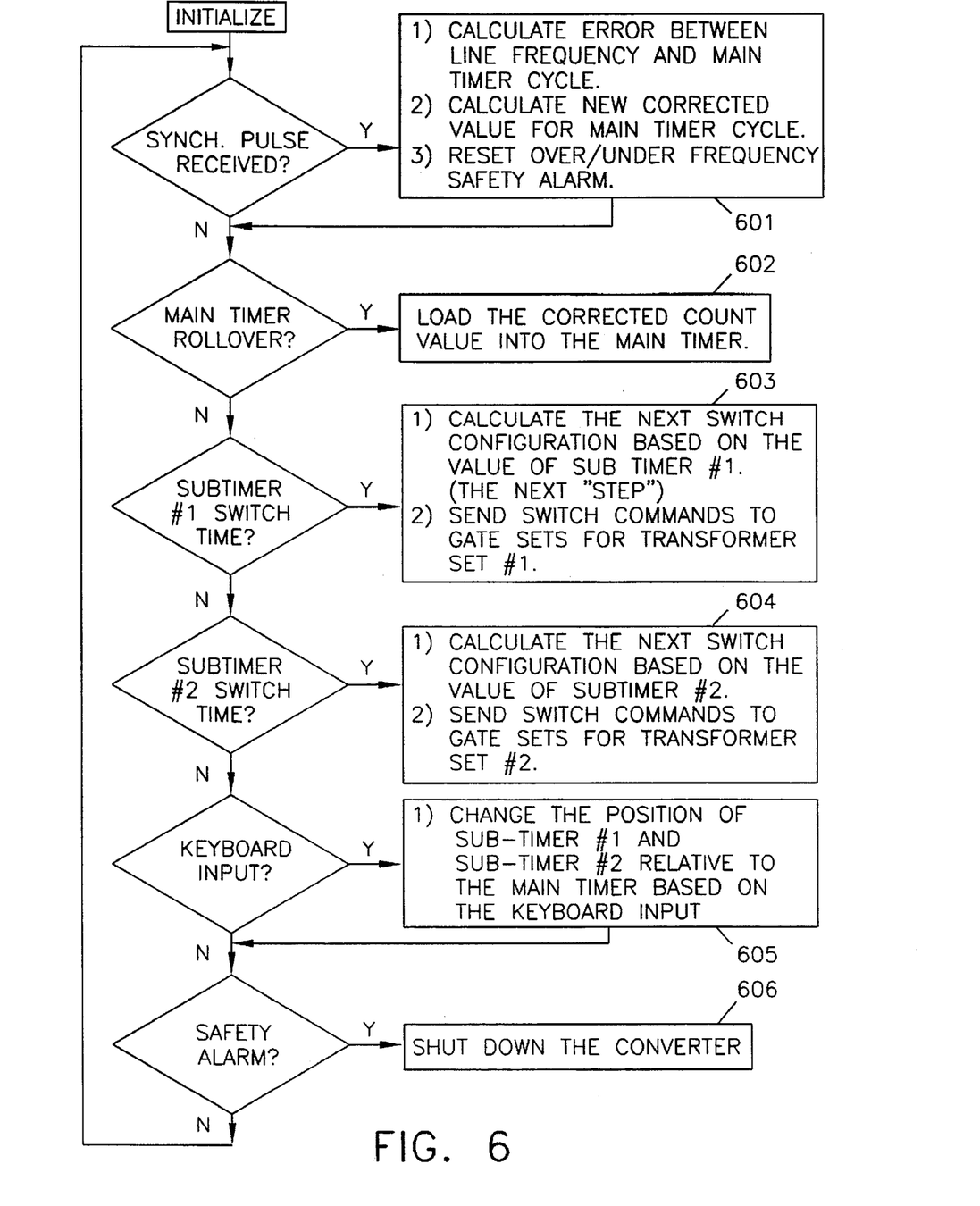
FIG. 6 is a flow chart of the algorithm of the present invention.
Figure 7:
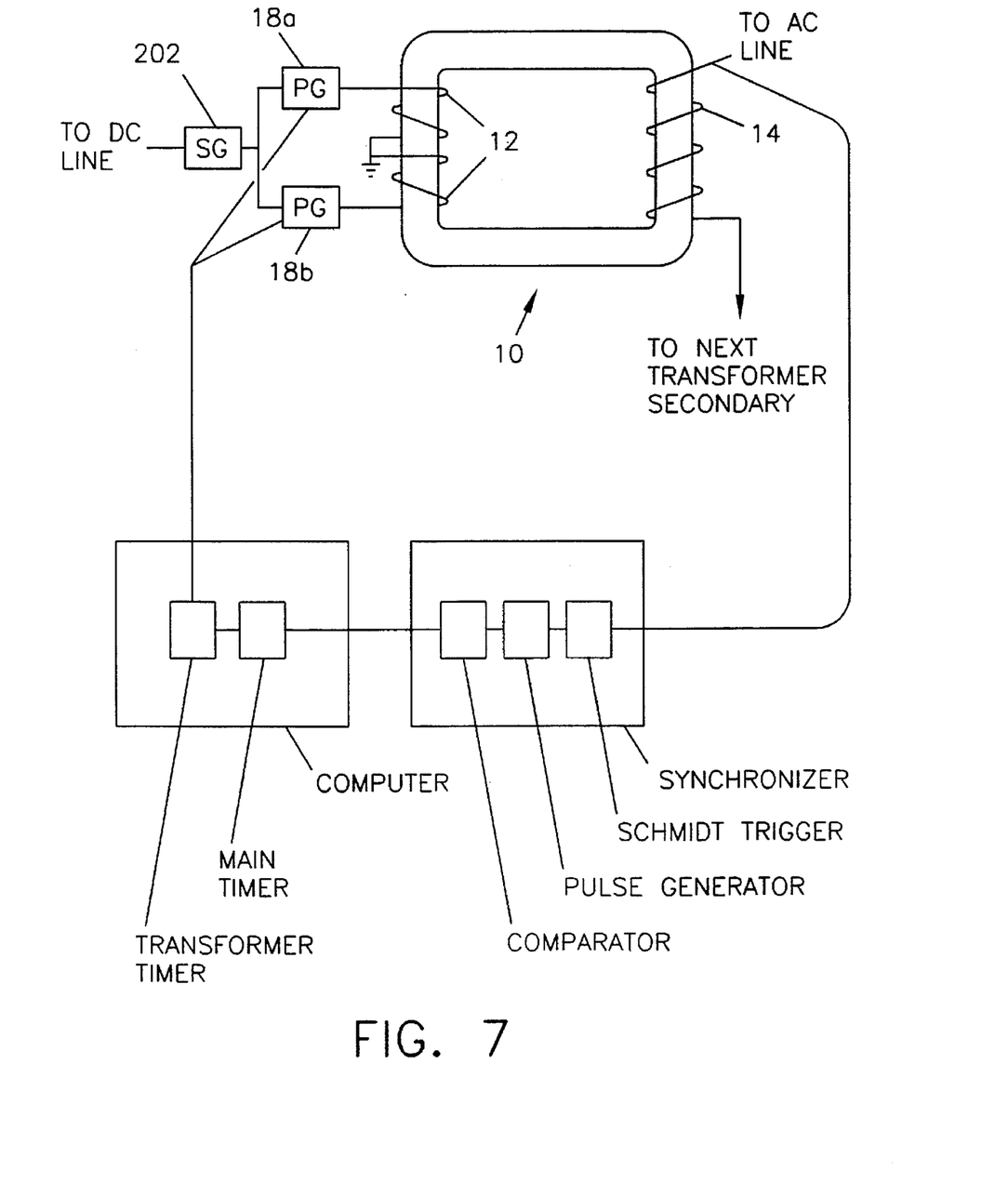

The algorithm of the present invention is shown in FIG. 6. In the first step 601, the synchronizing pulse is compared to an AC line frequency to determine the delay necessary for synchronization. The second step 602 involves placing the delay into the main timer. The third and fourth steps 603, 604 are identical to the control steps described above with respect to FIG. 1c, but using the main timer delay. However, by using two sets of control steps 603, 604, four quadrant control is achieved, which was not previously possible. Use of multiple sets of control steps required the addition of sub-timers inserted between the main timer and the transformer timers with the sub-timers slaved to the main timer. Each subtimer is connected to a set of transformer timers. Step 605 permits user control of the master-slave relationship between main and sub-timers. Step 606 shuts down the computer in the event of a potentially damaging event.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A converter having at least two switched DC transformers, said switched DC transformers each having two primary coils connected to at least one DC power line, and having a single secondary coil, wherein said two primary coils of each transformer are in parallel to each other, and said secondary coil of each transformer is in series with an other transformer secondary coil, said converter further having a power injection gate in series with each of said primary coils, wherein the improvement comprises:

(a) only one shorting gate on each transformer; and
   (b) each of said single shorting gates is a single antiparallel shorting gate, and each power injection gate is an anti-parallel power injection gate.

2. The converter as recited in claim 1, wherein said single anti-parallel shorting gate is on the primary side of each transformer.

3. The converter as recited in claim 2, wherein said single anti-parallel shorting gate is parallel to both of said primary coils in each transformer.

4. The converter as recited in claim 3, wherein said single anti-parallel shorting gate is between said power injection gates and said primary coils.

5. The converter as recited in claim 1, wherein said anti-parallel shorting gate is electrically up stream of and parallel to said power inverter gates.

6. The converter as recited in claim 1, further comprising:

a control computer having a main timer and a transformer timer for each transformer wherein a signal from said transformer timer operates said power injection gates.

7. The converter as recited in claim 6, further comprising a synchronizer for providing a synchronizing signal to the main timer.

8. The converter as recited in claim 7, wherein said synchronizer comprises:

(a) a Schmidt Trigger that receives a positive-slope zero crossing of an AC line voltage,
   (b) a pulse generator that receives an output from the Schmidt Trigger, and
   (c) a comparator that receives a second output from the pulse generator and sends a third output as the synchronizing signal to the main timer.

9. The converter as recited in claim 6, further comprising:

an instruction set within said computer for passively controlling said shorting gates based upon control of the power gates.

10. The converter as recited in claim 9, wherein said instruction set comprises:

$$G_{SG} = \overline{G_a \text{ AND } G_b} \rightarrow \text{NOT}(G_a \text{ AND } G_b),$$

wherein G is a power gate firing pulse (voltage) for a specified power gate.

11. The converter as recited in claim 9, wherein said instruction set comprises:

$$G_{SG} = \overline{G_a \text{ OR } G_b} \rightarrow \text{NOT}(G_a \text{ OR } G_b),$$

wherein G is a power gate firing pulse (voltage) for a specified power gate.

12. The converter as recited in claim 6, further comprising a plurality of subtimers each connected to a plurality of transformer timers, said subtimers slaved to the main timer.

13. The converter as recited in claim 7, further comprising an algorithm within the control computer, said algorithm for directing signals through the main timer to the subtimers and to the transformer timers, thereby providing four quadrant control.

* * * * *